July 26, 1966  G. J. HUEBNER, JR., ET AL  3,262,676
TURBINE WHEEL
Filed May 27, 1964  3 Sheets-Sheet 3
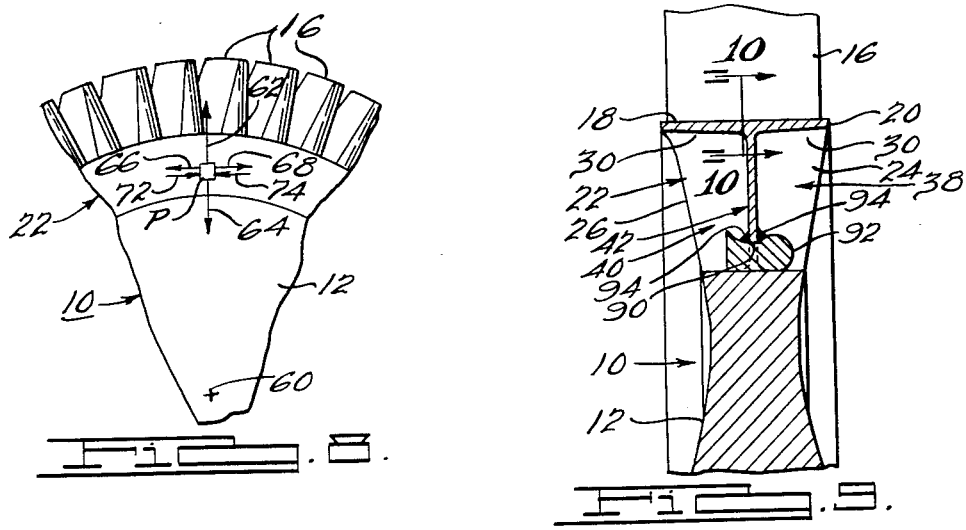
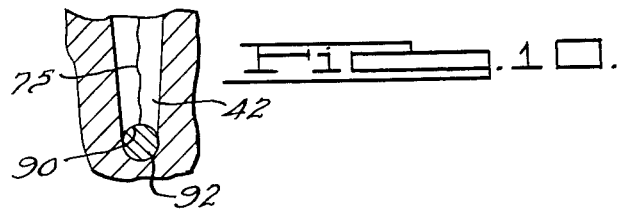
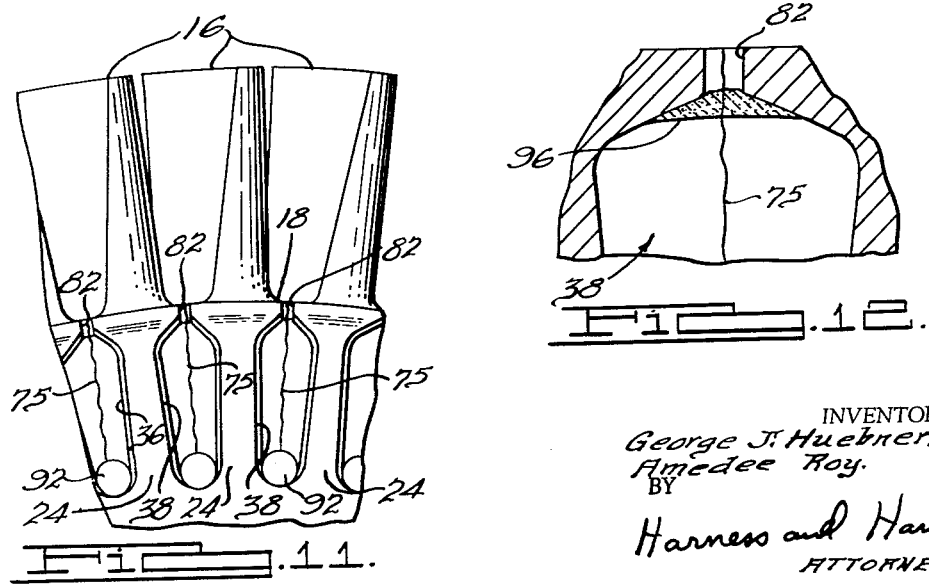
INVENTORS.
George J. Huebner, Jr.
Amedee Roy.
BY
Harness and Harris
ATTORNEYS.

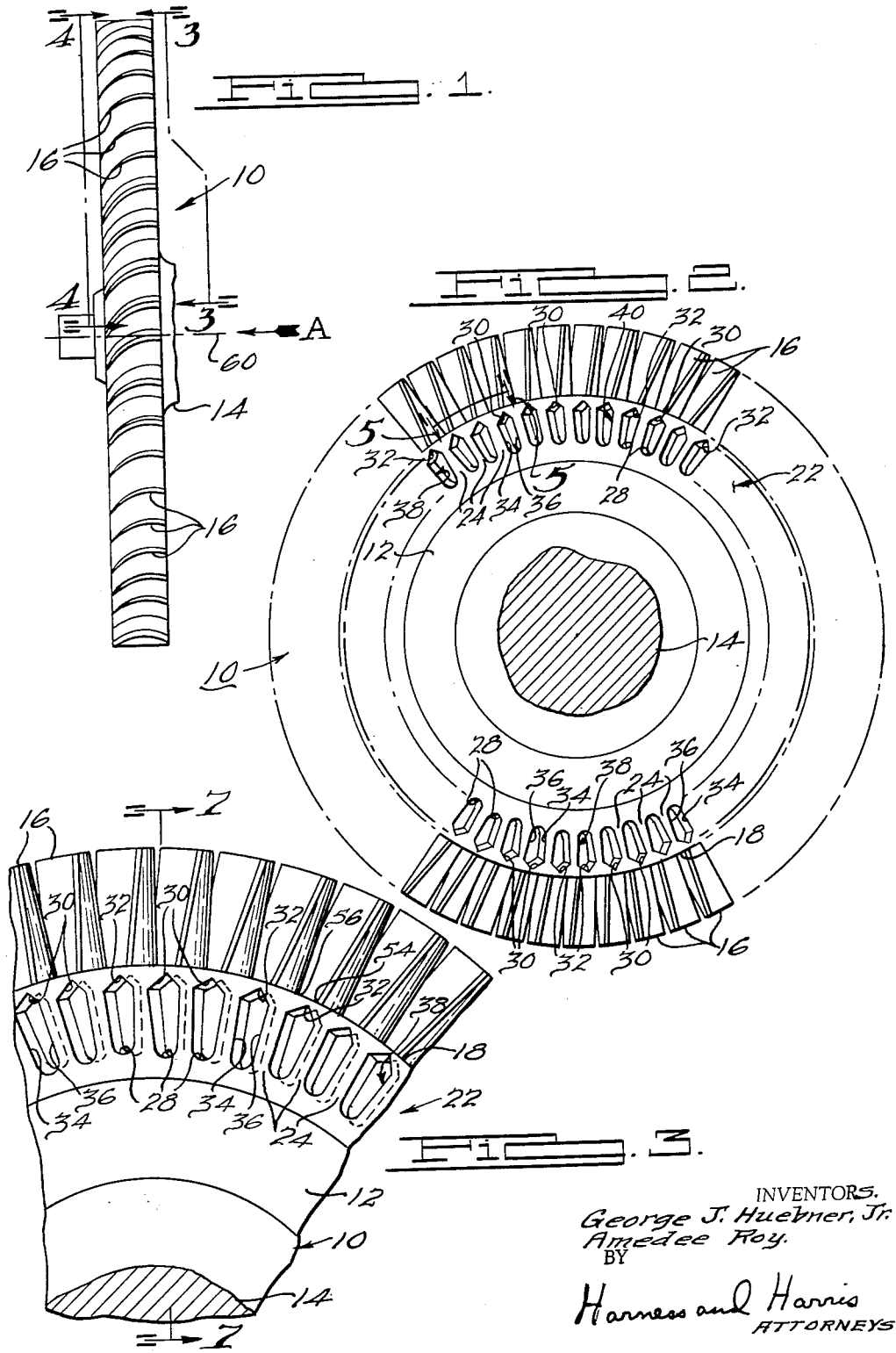

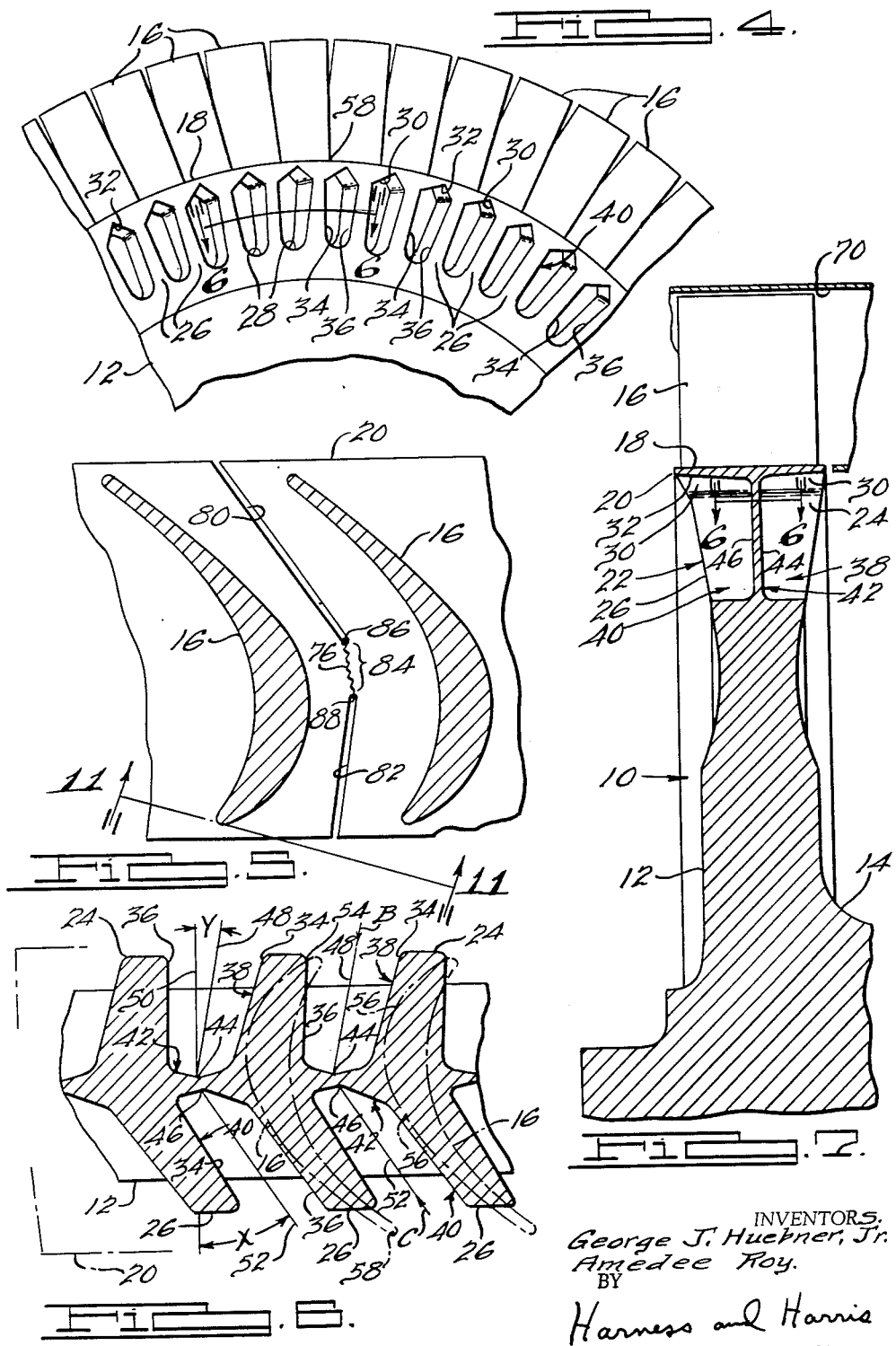

1

3,262,676
TURBINE WHEEL
George J. Huebner, Jr., Bloomfield Hills, and Amedee Roy, Birmingham, Mich., assignors to Chrysler Corporation, Highland Park, Mich., a corporation of Delaware
Filed May 27, 1964, Ser. No. 370,611
5 Claims. (Cl. 253—77)

This invention relates generally to a gas turbine engine and more particularly to a turbine wheel for use therein.

In the past, turbine wheels have been formed so as to be comprised generally of a disc-like body portion having a rim formed thereon or secured thereto and a plurality of radially directed circumferentially spaced blades formed on or secured to the rim portion. In some instances the disc body has also been provided with a hub portion for securing the wheel to a cooperating shaft.

In every application of a turbine wheel one of the prime considerations is the inertial characteristics of the wheel. That is, in order to assure quick response by the wheel to the motive fluid passing therethrough, precautions are normally taken to reduce the polar moment of inertia of the wheel. This usually is achieved by reducing the mass of the wheel in somewhat a proportion to the radial distance of that mass away from the axis of rotation of the wheel.

In gas turbine engine applications, the turbine wheels experience various stresses during normal engine operation. These stresses can be broadly classified into three general categories the first of which includes mechanical stresses due to the centrifugal force resulting from high speed rotation of the turbine wheel. The second category includes those stresses arising from the vibratory energy induced into the turbine wheel, while the third category of stresses could be referred to generally as thermo-stresses arising from exposure of at least the turbine blades to relatively high heats as that occasioned by the extremely hot motive gases passing therethrough.

Because of these three categories of stresses the mass of the rims and bodies of turbine wheels of the prior art design could not be effectively reduced to the degree desired in order to obtain a highly responsive turbine wheel. That is, heretofore it has been considered necessary to have the rim and disc body adjacent the rim of a cross-sectional thickness sufficient to prevent cracking of the turbine wheel due to the stresses developed during operation. The cross-sectional thickness in such instances has in turn caused the general peripheral mass of the wheel to increase to the degree resulting in a considerable increase in inertia and consequent loss in wheel acceleration response.

Accordingly, an object of this invention is to provide a novel and improved turbine wheel which has a relatively low polar moment of inertia.

Another object of this invention is to provide a turbine wheel of a configuration which effectively reduces thermal stresses normally developed during exposure to relatively hot motive gases.

Still another object of this invention is to provide a turbine wheel of a configuration which effectively reduces or minimizes the occurrence of induced vibratory stresses.

Other objects and advantages of the invention will become apparent when reference is made to the following description and accompanying drawings wherein:

FIGURE 1 is a side elevational view of a turbine wheel constructed in accordance with the teachings of this invention;

FIGURE 2 is an end view of the turbine wheel taken generally in the direction of arrow A of FIGURE 1;

FIGURE 3 is an enlarged fragmentary elevational view taken substantially on line 3—3 of FIGURE 1;

2

FIGURE 4 is an enlarged fragmentary elevational view taken substantially on line 4—4 of FIGURE 1 and looking in the direction of the arrows;

FIGURE 5 is a fragmentary elevational view taken generally on line 5—5 of FIGURE 2;

FIGURE 6 is an enlarged fragmentary cross-sectional view taken generally on the plane of line 6—6 of FIGURE 4, also illustrated in FIGURE 7, and looking in the direction of the arrows;

FIGURE 7 is an enlarged fragmentary cross-sectional view taken generally axially of the turbine wheel as, for example, on the plane of line 7—7 of FIGURE 3;

FIGURE 8 is a fragmentary view, similar to FIGURE 3, diagrammatically illustrating the forces incurred by an infinitesimal particle of the turbine wheel during periods of operation;

FIGURE 9 is an enlarged fragmentary cross-sectional view similar to FIGURE 7 illustrating in further detail one form of the invention;

FIGURE 10 is a fragmentary cross-sectional view taken substantially on line 10—10 of FIGURE 9 and looking in the direction of the arrows;

FIGURE 11 is an enlarged fragmentary view taken substantially on the plane of line 11—11 of FIGURE 5; and FIGURE 12 is an enlarged fragmentary view of a portion of FIGURE 11.

Certain details are omitted from one or more figures for purposes of clarity.

Referring now in greater detail to the drawings, a turbine wheel 10 is illustrated as being comprised generally of a disc-like body 12 provided with a centrally disposed hub portion 14 for mounting the body 12 to a suitable shaft, and a plurality of radially directed circumferentially spaced blades 16 against which a cooperating motive fluid is directed in order to impart rotative motion to the turbine wheel 10 and its associated shaft. Blades 16 are formed as to extend generally radially outwardly from the outer surface 18 of rim 20 which comprises a portion of an annular support or pedestal arrangement 22.

The annular support 22 is comprised of a plurality of generally radially directed circumferentially spaced front and rear struts or ribs 24 and 26, respectively. The terms "front" and "rear" are used to denote the position of the ribs axially of the wheel 10. That is, the front ribs 24 would be on the upstream side of the wheel while the rear ribs 26 would be on the downstream side of the wheel.

Succeeding ribs or struts are joined to each other at their respective radially inner-most ends by a fillet-like arcuate portion 28 as shown generally in FIGURES 2, 3, and 4. The radially outer-most ends of each of the ribs is provided with a tapered portion 30 which tapers outwardly from the rib and joins a similarly tapered portion of the adjacent rib to form an apex or juncture 32 which is generally coterminous with the lower portion of the rim 20.

Surfaces 34 and 36 of adjacent front ribs 24 along with tapered portions 30 and arcuate portions 28 collectively define front recesses 38 which extend inwardly and generally axially of the wheel 10. Similarly, surfaces 34 and 36 of adjacent rear ribs 26 along with associated tapered portions 30 and arcuate portions 28 collectively define rear recesses 40 which also extend inwardly and generally axially of the wheel. As illustrated in FIGURES 6 and 7, the front and rear recesses extend inwardly of the wheel 10 towards each other and are separated by a common thin wall 42.

It should be noted that both recesses 38 and 40 extend inwardly into the wheel 10 at a slight angle with respect to a plane containing the axis of the wheel. For example, a plane passing through the middle of recess 38 will have a trace 48 at an angle Y with respect to trace 50 of the plane passing through the axis of wheel 10. Similarly, a plane passing through the middle of recess 40 will have a trace 52 which is at an angle X with respect to trace 50. In the embodiment disclosed, angle X is greater than angle Y; however, as will become apparent the precise relationship of angles X and Y is not controlling in the practice of the invention.

Both sides of each of the walls 42 are preferably tapered inwardly towards each other so as to form indentations 44 and 46 generally along the wall 42 and radially of the wheel 10. Indentations 44 and 46 are provided in order to define an area of reduced cross-sectional thickness in walls 42 thereby creating an area for stress concentration. In certain of particularly successful embodiments of the invention the thickness of the reduced portion of the walls 42 was in the order of 0.010 to 0.020 inch.

In FIGURE 6 the root profile of a couple of blades 16 is illustrated in phantom line in order to better illustrate the position of the respective blades to the ribs 24 and 26 immediately radially inwardly of the rim 20.

Referring to FIGURES 3, 4 and 6, if recesses 38 are viewed in the direction of arrow B of FIGURE 6, it can be seen that the outer-most end of the respective apexes 32 are substantially midway of the projected distance between root 54 of the front of one of the blades 16 and root 56 of a median portion of the next adjacent blade 16. Similarly, if recesses 40 are viewed in the direction of arrow C of FIGURE 6, it can be seen that the outer-most end of the respective apexes 32 of recesses 40 are substantially midway of the projected distance between root 58 of the rear of one of the blades 16 and the root 56 of the median portion of the next adjacent blade 16.

In FIGURE 6, the forward and rearward ends of the respective blades are shown as projecting some distance beyond ribs 24 and 26. Such ends are, however, fully supported by the respective ribs because, as illustrated, for example, in FIGURES 3, 4, and 5, the ribs are provided with not only tapered portions 30 but also taper outwardly from the axially medial portion of the wheel so as to have the largest width axially of the wheel immediately below the rim 20. FIGURE 6 is a cross-sectional view obtained on lines 6—6 of either FIGURE 4 or 7 somewhat radially inwardly of where tapered portions 30 join surfaces 34 and 36.

Referring to FIGURES 1 and 8, let it be assumed that the wheel 10 is caused to rotate about its axis 60 and that the square, identified as P, is an infinitesimal particle of the wheel. Due to the centrifugal and centripetal forces developed during rotation of wheel 10, particle P experiences tension as illustrated generally by the force vectors 62 and 64. That is, particle P is urged radially outwardly of wheel 10 but at the same time restrained to some degree by the adjoining particles. The greater the angular velocity, the greater, of course, are forces 62 and 64.

With the high rotational speeds experienced by turbine wheels actual radial expansion of the wheel is incurred. Accordingly, it can be appreciated that such radial expansion requires substantially every infinitesimal particle of the wheel to experience slight radially outward movement. Consequently, the infinitesimal particles circumferentially adjoining particle P cause particle P to be placed in a state of generally circumferential or tangential tension as indicated by force vectors 66 and 68.

The forces described above are those resulting from merely rotation of the turbine wheel. However, additional forces are created whenever the wheel 10 is exposed to high heat, as for example, the hot motive gases employed in a gas turbine engine.

Referring to FIGURES 7 and 8, let it be assumed that hot motive gases are being directed through an annular conduit 70 and against blades 16 so as to impart rotative motion to wheel 10. Due to rotation, particle P will, of course, experience forces 62, 64, 66 and 68 as previously described. However, because of the heat transfer incurred as between the hot motive gases, the blades 16 and pedestal structure 22, the forces developed on particle P are somewhat altered.

For example, referring to FIGURE 7 it should be apparent that a temperature gradient will exist as between generally blades 16 and the hub 14 of wheel 10 due to the relatively cold hub 14 and the hot motive gases. Consequently, the radially outer-most portions such as rim 20 and support structure 22 expand to a greater extent than the adjoining radially inner portions of the wheel 10.

Therefore, since portion 12 of wheel 10 prevents rim 20 and support structure 22 from expanding to the degree normally required by the temperature of the rim and support, rim 20 and wall 42 of support 22 are placed in a state of circumferential or tangential compression. If particle P of FIGURE 8 is considered to be a particle of rim 20, for example, it becomes apparent that because of the attempt to expand by the circumferentially adjoining particles and the restraining effect thereon by the relatively cooler portion of the wheel, that particle P is now placed in a condition of circumferential or tangential compression as indicated generally by force vectors 72 and 74 which have replaced vectors 66 and 68. As the temperature gradient increases the compression experienced in the rim 20 becomes sufficient to result in plastic deformation of the rim material. The deformation accommodates, to some degree, the expansion required by the relatively hot radially outer portions of the wheel.

However, upon subsequent cooling of the wheel 10, as occasioned during, for example, engine shut-down or reduced temperature and engine output, a reversal of forces occurs. That is, those sections of the radially outer portion of the wheel 10, such as rim 20, attempt to contract and return to their normal state free of induced stresses. However, such contraction is inhibited because these very same portions have previously undergone plastic deformation. Consequently, the particles, such as P, which were previously in a state of tangential compression are once more placed in a state of circumferential or tangential tension as illustrated generally by force vectors 66 and 68. These forces in turn cause cracks to occur generally radially of wheel 10 at points of greatest stress concentration.

The problem of thermally induced stresses as described above is well known to the prior art. It has been a commonly accepted belief, by those skilled in the art, that such thermally induced wheel cracks are incompatible to an otherwise properly functioning turbine wheel and that a turbine wheel which developed such cracks could not be further safely employed within an engine. Consequently, the prior art has theretofore proposed various arrangements for strengthening the turbine wheel rim and/or thermally isolating the wheel blades 16 from the supporting rim structure. Such proposed solutions have not, however, proven to be entirely satisfactory.

In the embodiment of the invention disclosed, not only does rim 20 experience the various forces described but so also does the wall or web 42 separating recesses 38 and 40. This invention, contrary to the prior art and contrary to the commonly accepted belief by those skilled in the art, provides an arrangement specifically intended to give rise to the occurrence of such thermally induced cracks.

As previously stated, the cross-sectional thickness from apexes 32 to surface 18 of rim 20 are minimal as are the cross-sectional thickness of webs 42 between indentations 44 and 46. Accordingly, as compressive forces are created, due to temperature gradients, plastic deformation, if it is to occur, will exhibit itself to the greatest extent in such sections of reduced cross-sectional area. Subsequently, as wheel 10 cools, during periods of, for example, engine shutdown, reverse tangential tension forces occur on the infinitesimal particles comprising such sections of reduced cross-sectional area. Consequently, contrary to the prior art, cracks are encouraged to occur through such sections of localized stress. As such cracks occur, they will appear through webs or walls 42 in the vicinity of indentations 44 and 46 so as to assume a generally radial position with respect to the axis 60 of the wheel 10. Further, cracks will also occur generally axially of wheel 10 through rim 20 so as to be in a pattern generally defined by plane traces 48 and 52 of FIGURE 6.

Just as radial cracks 75 will occur in webs 42 at the areas of greatest stress concentration which would, in the embodiment of the invention disclosed, be determined by indentations 44 and 46, the axial cracks would also occur at the areas of greatest stress concentrations as would be determined by apexes 32.

It has been found that generally radial cracks 75 do not occur unless there is a corresponding axially directed crack through the rim 20. Further, it has been discovered that in significant number of instances the number of axially directed cracks formed in a turbine wheel was relatively small as compared to the number of axially directed cracks which could possibly have developed. That is, conceivably an axially directed crack should be developed between each pair of adjoining blades 16 because an area of localized stress is created there by the provision of apexes 32.

The invention as herein disclosed contemplates the provision of means for causing a significantly higher incidence of axially directed rim cracks. One of the important benefits to be derived is an improved turbine wheel which is more nearly perfectly dynamically balanced thereby being inherently capable of significantly greater operational speeds while, at the same time, materially reducing problems of bearing wear and vibration.

For example, assuming that a particular turbine wheel had fifty blades spaced circumferentially thereabout, it is apparent that a maximum of fifty axially directed cracks could be expected to be formed through the rim 20. However, if it is assumed that in this particular wheel only, for example, five axially directed rim cracks are formed, and all of these cracks are formed as between succeeding pairs of adjoining blades, it should be apparent that some of the mass of the wheel has been displayed somewhat tangentially from its original position thereby causing a corresponding movement in the center of gravity of the wheel. In some cases this change or shift in the center of gravity can be negligible, while in other instances a shift in the center of gravity accompanied by extremely high rotational speeds of the wheel can become a serious vibration problem in the engine.

Accordingly the more axial cracks that can be formed through the rim (between blades) and the more that such cracks are substantially equally spaced circumferentially about the rim, then the greater the probability that the center of gravity of the wheel will remain substantially in its original location and that problems of vibration during high speeds will be minimized, if not completely eliminated.

In furtherance of the above, the invention as herein disclosed contemplates the provision of slits 80 and 82 as illustrated for example in FIGURES 5 and 11, which are pre-formed through the apexes 32 in the sense that they are formed within rim 20 prior to the actual use of the wheel 10 within the engine. Preferably the slits are made as narrow as possible and, in some cases, extremely good results have been obtained with slits of a width in the order of 0.005 inch.

As best seen in FIGURE 5, it is not necessary that slits 80 and 82 intersect or join each other. The relatively small portion 84 of the rim 20 intermediate the innermost ends of slits 80, 82 is actually a very small portion of the overall width of the rim 20 and in most cases will be found to be substantially equal to the thickness of the web 42 immediately radially inwardly of the slits 80, 82.

By providing slits 80 and 82, the cyclic heating and cooling of the wheel now causes all of the tangential rim stresses to be localized within portion 84, thereby greatly increasing the probability that, for example during cooling, a fracture will be incurred between ends 86 and 88 of slits 80, 82, thereby completing a continuous crack-like pattern generally axially of the rim. The fact that a relatively small rim portion 84 is provided to restrain growth and contraction of the wheel greatly increases the probability that cracks as indicated at 76 will occur as between pairs of adjoining blades 16, thereby tending to create a more nearly balanced wheel and at the same time reducing stresses throughout a greater portion of the wheel.

The radial cracks 75 will, of course, travel radially inwardly towards the center of wheel 10. Therefore, any suitable means such as aperture 90 formed through the wall or web 42 will provide a barrier to the further propagation of such radial cracks beyond predetermined limits. Further, in order to prevent the occurrence of a leakage path for the motive gases through apertures 90, a suitable filler such as a rivet 92 provided in each of the apertures 90 can be employed for filling each of said apertures. In order to obtain greater assurance of the non-occurrence of leakage paths, a suitable spray material comprised of, for example, a high temperature alloy 94 can be sprayed about each of the rivets in the vicinity of the respective apertures 90 so as to form a barrier through which motive gas could not pass.

In certain situations it has been found highly advantageous to present a substantial barrier to the passage of motive gases through slits 80 and 82. It has been discovered that this can be successfully accomplished by directing a suitable filler material, as by a plasma arc spray method, upwardly into recesses 38 and 40 and against the surfaces generally defining slits 80 and 82 thereby forming a layer 96 as generally indicated in FIGURE 12. The layer of filler material 96 will not prevent the occurrence of cracks 75 or 76 and yet because of the irregular surface formed therethrough when cracks 75 and 76 occur, the layer 96 functions as an effective barrier to the passage of gases therethrough.

Although only one preferred embodiment of the invention has been disclosed, it is apparent that other embodiments and modifications of the invention are possible within the scope of the appended claims.

We claim:

1. A turbine wheel comprising a disc-like body, an annular pedestal portion radiating therefrom and circumferentially thereabout, a plurality of circumferentially spaced turbine wheel blades supported on said pedestal portion and radiating outwardly therefrom, said pedestal portion comprising a plurality of circumferentially spaced radially extending generally axially directed ribs joined at their respective radially innermost ends to said body, an arcuate connecting portion joining the radially innermost ends of pairs of adjacent ribs so as to provide a surface for stress dissipation between such adjacent ribs, an annular axially directed rim joining the radially outermost ends of said ribs, a tapered connecting portion formed on each side of each of said ribs near the radially outermost end thereof and joining the radially innermost surface of said rim, a web generally transverse of said wheel joining adjacent ribs medially thereof, a plurality of generally axially directed radially extending front and rear recesses defined generally by said ribs, arcuate connecting portions, tapered connecting portions and webs, a plurality of first slits each of which is formed through said rim so as to be generally between said tapered connecting portions in said front recesses and extending axially of said rim to terminate in close proximity to said web, a plurality of second slits each of which is formed through said rim so as to be generally between said tapered connecting portions in said rear recesses and extending axially of said rim to terminate in close proximity to said web, each of said front recesses being so formed as to have a generally radial plane passing through the middle thereof form a slight angle with respect to a plane containing the axis of said wheel, each of said rear recesses being so formed as to have a generally radial plane passing through the middle thereof form a large angle with respect to said plane containing the axis of said wheel which is substantially greater than said slight angle formed by said front recesses, and means provided radially along each of said webs for creating areas of localized stress concentrations therealong.

2. A turbine wheel comprising a disc-lke body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localized thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient, and subsequently permitted to experience a reduction in said temperature gradient, and a plurality of generally axially directed slits formed in said rim, each of said slits being formed so as to extend from an axial end of said rim and terminating in close proximity to said wall, said slits forming an additional area for stress concentration in order to enhance the opportunity for said controlled cracks to occur.

3. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially innermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, and a plurality of generally axially directed slits formed in said rim generally between at least selected ones of said struts and extending generally axially through a major portion of said rim, and slits providing additional areas for stress concentration in order to further enhance the opportunity for said controlled cracks to occur.

4. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, and additional axially directed stress localizing means for further enhancing the occurrence of said cracks, said additional axially directed stress localizing means comprising a plurality of first generally axially directed slits formed in said rim so as to start at one axial side of said rim and extend inwardly a distance closely approaching half the axial width of said rim, a plurality of second generally axially directed slits formed in said rim so as to start at the other axial side of said rim and extend inwardly generally toward said first slits a distance closely approaching but less than half the axial width of said rim, said second slits terminating so as to have the termination thereof in close proximity to the termination of said first slits.

5. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, a plurality of generally axially directed slits formed in said rim between at least selected ones of said turbine blades for further enhancing the occurrence of said cracks, and sealing means comprising at least a layer of high temperature alloy forming a substantial gas barrier across said slits.

References Cited by the Examiner
UNITED STATES PATENTS

| | | | |
|---|---|---|---|
| 2,380,276 | 7/1945 | Warren | 253—77 |
| 2,460,893 | 2/1949 | MacClutcheon | 253—77 |
| 2,472,886 | 6/1949 | Conrad et al. | 253—77 |
| 2,660,400 | 11/1953 | Griffith | 253—77 |
| 2,772,854 | 12/1956 | Anxionnaz | 253—77 |
| 2,888,239 | 5/1959 | Slemmons | 253—39 |
| 2,922,619 | 1/1960 | Slemmons | 253—77 |
| 3,104,093 | 9/1963 | Craig | 253—77 |

FOREIGN PATENTS

| | | |
|---|---|---|
| 624,166 | 7/1961 | Canada. |
| 1,256,467 | 2/1961 | France. |
| 652,099 | 4/1951 | Great Britain. |
| 708,836 | 5/1954 | Great Britain. |

MARTIN P. SCHWADRON, *Primary Examiner.*

E. A. POWELL, JR., *Assistant Examiner.*